Oct. 5, 1965

R. G. RUTHERFORD

PUMP CONSTRUCTION

Original Filed Dec. 7, 1961

Re. 25,873

Inventor
RUSSELL G. RUTHERFORD
Andrew F. Winterson
Atty.

United States Patent Office

Re. 25,873
Reissued Oct. 5, 1965

25,873
PUMP CONSTRUCTION

Russell G. Rutherford, R.R. 6, Hutchins Park, Rockford, Ill.

Original No. 3,142,258, dated July 28, 1964, Ser. No. 157,759, Dec. 7, 1961. Application for reissue Apr. 23, 1965, Ser. No. 458,507
4 Claims. (Cl. 103—48)

Matter enclosed in heavy brackets [ ] appears in the original patent but forms no part of this reissue specification; matter printed in italics indicates the additions made by reissue.

This invention relates to a new and improved pump construction, the salient feature of which is the ease and facility with which the same may be taken apart and reassembled, so as to permit thoroughly cleaning the same, as required for sanitation where food products are being handled, and as also becomes necessary with various other materials being handled, pumps made in accordance with my invention having been used in the pumping of a wide range of liquids and semi-liquid materials or slurries.

The pump of my invention embodies the following novel features:

(1) The tubular bodies of the pump cylinder and air cylinder are (for the sake of economy, mainly) both made from lengths of plastic tubing, using polyvinyl chloride or other plastic material not subject to attack by acids and alkalies, a single elongated plastic plug having a large diameter portion to fit detachably in one end of the power cylinder and a smaller diameter concentric portion to fit detachably in the adjacent end of the pump cylinder serving to interconnect the two cylinders mechanically in rigid coaxial relationship to one another, and two other plastic plugs being detachably mounted in the other ends of the two cylinders as closures therefor, the first mentioned plug providing also a bearing for the reciprocable piston rod that interconnects the pump piston with the air-operated power piston.

(2) The opposite ends of the plastic tube forming the body for the power cylinder are turned down to the desired reduced diameter externally for demountable bearing support in circular holes provided in a pair of end blocks detachably secured to a supporting base plate, these two blocks when disposed in abutment with the annular shoulders defined at the inner ends of the reduced end portions of the cylinder providing rigid support for the pump and yet permitting reasonably quick and easy disassembly and reassembly.

(3) The three plastic plugs mentioned above have, in connection with each of the joints, two longitudinally spaced annular grooves provided therein, namely, an inner channel-shaped groove for an O-ring for sealing purposes, and an outer semi-circular groove to receive a pair of cylindrical retaining pins in diametrically opposed parallel relationship, disposed tangentially with respect to the bottom of the groove and entered with a close fit in holes provided therefor in the end portion of the cylinder, whereby to provide the desired quick detachability and yet insure leak-proof joints.

The invention is illustrated in the accompanying drawing, in which—

Similar reference numerals are applied to corresponding parts throughout the views.

Figure 1:
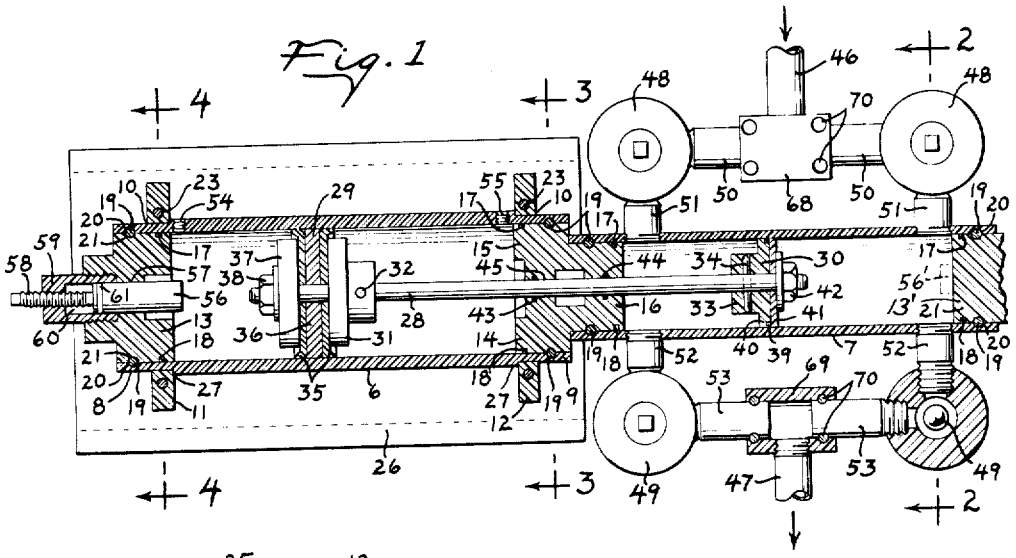
FIG. 1 is a longitudinal section in a horizontal plane through a pump of plastic construction made in accordance with my invention.
Figure 2:
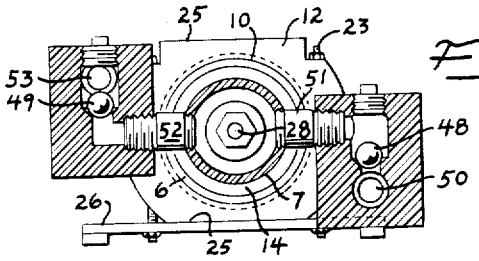
FIGS. 2, 3 and 4 are cross-sections in vertical planes on the correspondingly numbered lines of FIG. 1.
Figure 3:
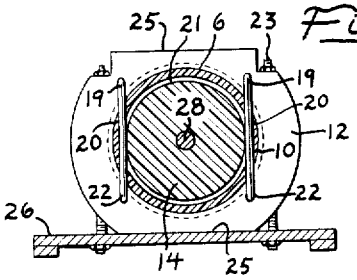
Figure 4:
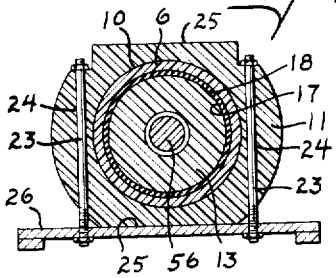

Referring first to FIGS. 1 to 4, the reference numeral 6 designates the power cylinder and 7 the pump cylinder, both made from pieces of plastic tubing, using polyvinyl chloride or other similar plastic material not subject to attack by acids and alkalies, the machining at 8 and 9 on the opposite ends of cylinder 6 to secure the desired reduced diameter externally for demountable bearing support in circular holes 10 in a pair of end-blocks 11 and 12 being done at low cost, so that the construction is fairly economical in relation to what a specially molded cylinder would cost, for example. Three cylindrical plugs 13, 14 and 13' are provided entered in the ends of the cylinders 6 and 7, as shown, to serve as end closures, plug 14 having half 15 of larger diameter to close the inner end of cylinder 6 and a smaller diameter half 16 closing the inner end of the adjacent inner end of cylinder 7. In each of these closures there is an annular channel-shaped groove 17 near the inner end of the plug in which an O-ring 18 is entered to provide a seal by its engagement on its inner periphery in the groove 17 and on its outer periphery in the bore of the plastic tube forming the wall of the cylinder 6 or 7. To fasten each plug against endwise displacement there are two diametrically opposed parallel retaining pins 19 entered with a snug fit in parallel holes 20, uprovided in the end portions of the cylinders 6 and 7, these holes being drilled almost, but not quite, tangent to the bores of the cylinders 6 and 7 so that half of the section of each pin 19 is left projecting into the bore, whereby the pins are adapted to enter an annular half round groove 21 provided in each of the plugs near the outer end thereof. In that way, the pins 19, which are provided long enough to have their rounded end portions 22 left projecting to the extent illustrated in FIG. 3, so that they can be taken hold of easily by means of pliers when they are to be removed, are adapted to be easily inserted and removed for quick and easy assembling and disassembling of the structure, as required in many applications of such pumps, where food products are being pumped and thorough cleaning is necessary after each day's use, not only as a matter of cleanlines and sanitation, but in many instances as a matter of necessity to prevent drying of any residue material interfering with operation later when pumping is to be resumed.

Parallel bolts 23 entered in parallel holes 24 in the diametrically opposed flat sides 25 of the blocks 11–12 serve to fasten them to a suitable supporting base 26, the bolt holes in the base 26 being so spaced in relation to the annular shoulders 27 defined at the inner ends of the reduced end portions 8 and 9 of the cylinder 6 to insure tight engagement of the blocks 11 and 12 with these shoulders for rigid support of the power cylinder 6 on the base 26, despite the fact that the construction is designed for quick and easy taking apart and putting together.

The middle plug 14, being elongated, provides a good bearing and guide for the piston rod 28 on which the power piston 29 is mounted on one end working in cylinder 6, and the smaller pump piston 30 on the other end working in cylinder 7, both of these pistons being of plastic construction and also adapted to be taken apart and put back together again easily to permit thoroughly cleaning the same at least daily if not oftener depending upon how the pump is used. Thus, the piston 29 includes a two diameter back plate 31 removably secured on the rod 28 by means of a pin 32 similarly as the back plate 33 for piston 30 is secured by means of pin 34, the piston 29, however, including two opposed plastic cup washers 35 on opposite sides of an intermediate disk 36, and an outer end plate 37 abutting one of these cup washers and fastened onto the end portion of the rod 28 by means of a nut 38 threaded on said rod, thereby securing all of the piston parts together between the front and back plates 37 and 31, respectively. The piston 30, on the other hand, has an O-ring 39 entered in an annular groove 40 provided in the periphery of the large diameter portion of the back plate 33, that is open on one side and adapted to be closed by means of a front plate 41 secured in place on the end portion of the rod 28 by means of a nut 42 threaded on the rod, as shown. O-rings 43 and 44 provided in annular grooves provided in opposite ends of the axial bore 45 in the plug 14 surround the rod 28 to prevent leakage along the rod 28 in either direction.

The pump illustrated in FIG. 1 is of a double-acting or two-way type, that is, while it is drawing in liquid or semi-liquid material from pipe 46 into one end of the cylinder 7, there is liquid or semi-liquid material simultaneously discharged through pipe 47 from the other end. This is by reason of the fact that there are opposed seating check valves 48 and 49 communicating with diametrically opposite sides of the cylinder 7 at both ends which on the suction stroke of the piston 30 draw the liquid or semi-liquid material into the cylinder 7 through pipe connections 50 and 51 in the unseating of check valve 48 and seating of check valve 49, the charge taken in on the suction stroke being discharged thereafter on the return stroke of the piston 30 through pipe connections 52 and 53 when the check valve 48 is seated and check valve 49 is unseated. Compressed air is used to operate the piston 29, it being delivered intermittently to first one end and then the other end of the cylinder 6 through ports 54 and 55 from a suitable source of compressed air through a two-way valve operable manually or automatically, as desired, so that while the air is admitted to one end of the cylinder 6, air is exhausted from the other end.

To enable fine adjustment of the stroke of piston 30, and accordingly vary the amount of liquid or semi-liquid material pumped and discharged per stroke, I have provided a plug 56 slidable in an axial hole 57 provided in the closure plug 13 and a manually adjustable screw 58 abutting the outer end thereof and mounted in a hollow plug 59 threaded in a hole in plug 13, the plug 59 having a bore 60 therein in which the outer end portion of plug 56 is slidable with a close fit, an O-ring 61 provided in an annular groove in the outer end portion of plug 56 providing a seal against air leakage. The stroke of piston 29 can be thereby accurately adjusted in one direction, and a similarly adjustable plug 56' provided in the plug 13' at the remote end of the pump cylinder 7 serves to limit movement of the piston 30 (and piston 29 with it) in the other direction.

Figure 5:
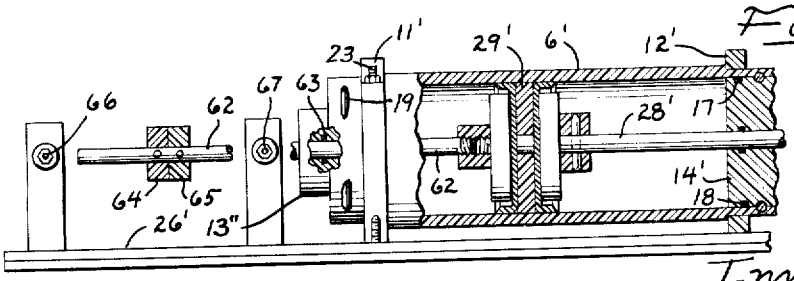
FIG. 5 is a view partly in side elevation and partly in vertical longitudinal section of another plastic pump construction having a different stroke adjusting means from that shown in FIG. 1, the pump being otherwise of the same construction.

In FIG. 5, the power cylinder 6' is similar to the power cylinder 6 and is similarly demountably secured by means of blocks 11' and 12' on a base 26', but in this construction the power piston 29' which operates a pump piston 30 (not shown) by connection therewith through a rod 28', has another rod 62 connected therewith and extending through the closure plug 13'', one or more suitable O-ring seals 63 being provided in the bore in the plug 13'' to prevent air leakage along the rod 62, the rod 62 carrying a pair of dogs 64 and 65 that are adjustable lengthwise of the rod to operate micro-switches 66 and 67, respectively, in any desired relationship to one another to reverse a solenoid-operated two-way air valve connected with compressed air inlet and exhaust ports 54 and 55 previously mentioned, provided in opposite ends of cylinder 6' and accordingly predetermine the length of the stroke of the power piston 29' and thereby measure quite accurately the amount of liquid and semi-liquid material pumped and discharged per stroke of the pump piston 30. The dogs 64 and 65 are shown in abutment in FIG. 5 in what would correspond to the longest stroke setting; if the dog 64 is adjusted toward the switch 66 and dog 65 is adjusted toward switch 67, it is obvious that the stroke will be shortened accordingly, and, if desired, the stroke in one direction can be shortened or lengthened relative to the stroke in the other direction, as where, for example, two different capacity containers are being filled from the same pump and alternately placed in position adjacent the discharge spout.

In operation, pumps of the present construction have been used for many different purposes, handling liquids of all kinds and semi-liquids of many kinds, to the point where the only limitation seems to be that the material need be only liquid enough to form a vacuum, for example:

(1) Cheese, such as cottage cheese and various dehydrated cheeses in vegetable oil;

(2) Fats, namely, animal fats, vegetable fats, and chopped fish slurries;

(3) Chemicals, namely, all liquid chemical and chemical slurries;

(4) Food slurries, namely, peas, corn, cherries, olives, and concentrated chicken slurry, and other slurries down to some that are only about 25% liquid;

(5) Waxes;

(6) Glues;

(7) Hand soaps;

(8) Mashed potatoes;

(9) Paints, varnishes and enamels, and

(10) Ice cream mixes.

The only limiting factor, outside the pump itself, is the check valves 48 and 49. For the handling of slurries, I have found it necessary to employ what I call my elliptomatic valves, which form the subject matter of my co-pending application, Serial No. 225,200, filed September 21, 1962. When these valves are used, operated by air or vacuum or hydraulically in timed relation to the reciprocation of the pistons 29 and 30, there is only about one percent (1%) or less damage by actual count in the handling of food slurries like peas, corn, cherries, olives, etc.

In the case of food products, the law requires cleaning of the equipment satisfactorily and with the present novel construction of the pump, that presents no problem, because all of the parts which come into contact with the food are made of plastic material not subject to attack by acids and alkalies, and all of these parts can be easily disassembled and reassembled so that there are no places where food can lodge and spoil. The easy disassembly and reassembly is practically of equal importance in the handling of various other liquid and semi-liquid materials, some of which, if the equipment were left uncleaned between uses, would dry and harden and positively interfere with operation of the equipment.

The T-fittings 68 and 69 connected with inlet and outlet pipes 46 and 47, respectively, are pinned to the pipe connections 50 and 53, as indicated at 70, using parallel pins similarly as at 19 in the case of the cylinders 6 and 7, whereby when these pins are removed, the fittings 68 and 69 may be slid laterally out of position enough to permit unthreading the one pair of valves 48 and 49 from their connections with the cylinder 7, and thereafter the other pair of valves can be unthreaded in a similar way, and thus all of the parts can be subjected to thorough cleaning.

It is believed the foregoing description conveys a good understanding of the objects and advantages of my invention. The appended claims have been drawn to cover all legitimate modifications and adaptations.

I claim:

1. A device of the character described comprising two coaxially arranged tubular cylinders, cylindrical closure plugs fixed in the remote ends of said cylinders, a single elongated closure plug common to the two cylinders having its opposite ends fixed in the adjoining ends thereof and maintaining their coaxial relationship, said last mentioned plug having an axial bore, a rod reciprocable therein, pistons fixed on opposite ends of said rod having a working fit in the respective cylinders, one of said cylinders being a power cylinder, and inlet and exhaust valve means connected with the opposite ends of said power cylinder to control communication thereto with a source of drive fluid under pressure, whereby the piston in the power cylinder is reciprocated in order to reciprocate the other piston, [the other cylinder being a pump cylinder and having ports provided in the opposite ends thereof adapted to be placed in communication with suction and discharge conduits for the pumping of liquid and semi-liquid materials,] *the other cylinder being a pump cylinder and having inlet and exhaust ports provided in one end thereof adapted to be placed in communication through inlet and exhaust valves with suction and discharge conduits for the pumping of liquid and semi-liquid materials,* each of the three closure plugs being adapted to be removed and replaced whereby to facilitate cleaning of the cylinder, plugs, and pistons, each plug for this purpose having an annular groove provided therein intermediate its ends receiving an O-ring of compressible resilient material adapted to be compressed radially between the annular groove and the wall of the cylinder when the plug is inserted therein, and means for quickly detachably securing each plug in said cylinder, the groove and O-ring being spaced from the inner end of the plug in relation to the cylinder, and the last mentioned means being located between said groove and the outer end of the plug and comprising an annular groove provided in the plug and parallel holes provided in the cylinder in diametrically opposed relationship opening intermediate their ends to the interior of the cylinder and adapted to be placed in register with diametrically opposed portions of said annular groove, and elongated pins inserted removably in said holes and having portions intermediate their ends projecting into said annular groove to retain the plug against axial displacement relative to the cylinder.

2. A device of the character described comprising two coaxially arranged tubular cylinders, cylindrical closure plugs fixed in the remote ends of said cylinders, a single elongated closure plug common to the two cylinders having its opposite ends fixed in the adjoining ends thereof and maintaining their coaxial relationship, said last mentioned plug having an axial bore, a rod reciprocable therein, pistons fixed on opposite ends of said rod having a working fit in the respective cylinders, one of said cylinders being a power cylinder, and inlet and exhaust valve means connected with the opposite ends of said power cylinder to control communication thereto with a source of drive fluid under pressure, whereby the piston in the power cylinder is reciprocated in order to reciprocate the other piston, [the other cylinder being a pump cylinder and having ports provided in the opposite ends thereof adapted to be placed in communication with suction and discharge conduits for the pumping of liquid and semi-liquid materials,] *the other cylinder being a pump cylinder and having inlet and exhaust ports provided in one end thereof adapted to be placed in communication through inlet and exhaust valves with suction and discharge conduits for the pumping of liquid and semi-liquid materials,* one of the first mentioned plugs being adapted to be removed from the pump cylinder and replaced, and the adjoining end of the elongated plug being likewise adapted to be removed from the pump cylinder and replaced, whereby to facilitate cleaning of the pump cylinder and said plugs, each plug for this purpose having an annular groove provided therein receiving an O-ring of compressible resilient material adapted to be compressed radially between the annular groove and the wall of the cylinder when the plug is inserted therein, and means for quickly detachably securing each plug in said cylinder, the groove and O-ring being spaced from the inner end of the plug in relation to the cylinder, and the last mentioned means being located between said groove and the outer end of the plug and comprising an annular groove provided in the plug and parallel holes provided in the cylinder in diametrically opposed relationship opening intermediate their ends to the interior of the cylinder and adapted to be placed in register with diametrically opposed portions of said annular groove, and elongated pins inserted removably in said holes and having portions intermediate their ends projecting into said annular groove to retain the plug against axial displacement relative to the cylinder.

3. A device of the character described comprising two coaxially arranged tubular cylinders, cylindrical closure plugs fixed in the remote ends of said cylinders, a single elongated closure plug common to the two cylinders having its opposite ends fixed in the adjoining ends thereof and maintaining their coaxial relationship, said last mentioned plug having an axial bore provided therein, a rod reciprocable therein, pistons fixed on opposite ends of said rod having a working fit in the respective cylinders, one of said cylinders being a power cylinder, and inlet and exhaust valve means connected with the opposite ends of said power cylinder to control communication thereto with a source of drive fluid under pressure, whereby the piston in the power cylinder is reciprocated in order to reciprocate the other piston, [the other cylinder being a pump cylinder and having ports provided in the opposite ends thereof adapted to be placed in communication with suction and discharge conduits for the pumping of liquid and semi-liquid materials,] *the other cylinder being a pump cylinder and having inlet and exhaust ports provided in one end thereof adapted to be placed in communication through inlet and exhaust valves with suction and discharge conduits for the pumping of liquid and semi-liquid materials,]* one of said cylinders having externally reduced end portions for mounting purposes, mounting blocks in transverse relationship to the opposite ends of said cylinder having circular openings provided therein to fit on the externally reduced end portions of the cylinder, a supporting base parallel to said cylinder, and means for securing said mounting blocks to the supporting base while assembled on the reduced end portions of said cylinder.

4. A device of the character described comprising two coaxially arranged tubular cylinders, cylindrical closure plugs fixed in the remote ends of said cylinders, a single elongated closure plug common to the two cylinders having its opposite ends fixed in the adjoining ends thereof and maintaining their coaxial relationship, said last mentioned plug having an axial bore provided therein, a rod reciprocable therein, pistons fixed on opposite ends of said rod having a working fit in the respective cylinders, one of said cylinders being a power cylinder, and inlet and exhaust valve means connected with the opposite ends of said power cylinder to control communication thereto with a source of drive fluid under pressure, whereby the piston in the power cylinder is reciprocated in order to reciprocate the other piston, [the other cylinder being a pump cylinder and having ports provided in the opposite ends thereof adapted to be placed in communication with suction and discharge conduits for the pumping of liquid and semi-liquid materials,] *the other cylinder being a pump cylinder and having inlet and exhaust ports provided in one end thereof adapted to be placed in communication through inlet and exhaust valves with suction and discharge conduits for the pumping of liquid and semi-liquid materials,* one of said cylinders having externally reduced end portions for mounting purposes, mounting blocks in transverse relationship to the opposite ends of said cylinder having circular openings provided therein to fit on the externally reduced end portions of the cylinder, a supporting base parallel to said cylinder, and means for securing said mounting blocks to the supporting base while assembled on the reduced end portions of said cylinder, said reduced end portions defining annular shoulders, the shoulders being so spaced with respect to the points of connection of the mounting blocks with the supporting base that the mounting blocks are disposed in tight engagement with said shoulders when secured to the base, holding said cylinder against endwise displacement with respect to said blocks in either direction.

References Cited by the Examiner

The following references, cited by the Examiner, are of record in the patented file of this patent or the original patent.

UNITED STATES PATENTS

| | | | |
|---|---|---|---|
| 303,701 | 8/84 | Carricaburu | 103—48 |
| 1,428,204 | 9/22 | Barnickel | 103—48 X |
| 1,565,884 | 12/25 | Aikman | 103—48 |
| 1,790,982 | 2/31 | Gamer | 103—48 X |
| 1,874,397 | 8/32 | Webb | 285—404 |
| 2,165,163 | 7/39 | Waters | 285—91 |
| 2,217,287 | 10/40 | McNew | 103—175 |
| 2,277,641 | 3/42 | Harter | 103—50 X |
| 2,417,025 | 3/47 | Volpin | 285—91 |
| 2,962,975 | 12/60 | Camp | 103—175 |
| 3,059,586 | 10/62 | Brailsford | 103—216 |

ROBERT M. WALKER, *Primary Examiner.*